(No Model.) 2 Sheets—Sheet 1.

M. R. RUBLE.
CENTRIFUGAL BLOWER.

No. 494,991. Patented Apr. 4, 1893.

WITNESSES:
Wm. D. Bell
D. Robertson

INVENTOR:
Martin R. Ruble
BY Gartner & Co
ATTORNEYS (No Model.) 2 Sheets—Sheet 2.

M. R. RUBLE.
CENTRIFUGAL BLOWER.

No. 494,991. Patented Apr. 4, 1893.

WITNESSES:
Wm. D Bell
D. Robertson

INVENTOR:
Martin R. Ruble
BY Cartner & Co.
ATTORNEYS

UNITED STATES PATENT OFFICE.

MARTIN R. RUBLE, OF NEWARK, NEW JERSEY.

CENTRIFUGAL BLOWER.

SPECIFICATION forming part of Letters Patent No. 494,991, dated April 4, 1893.

Application filed January 19, 1892. Serial No. 418,586. (No model.)

*To all whom it may concern:*

Be it known that I, MARTIN R. RUBLE, a citizen of the United States, residing at Newark, county of Essex, and State of New Jersey, have invented certain new and useful Improvements in Centrifugal Blowers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a blower or injector, simple and durable in construction, noiseless in operation and of great efficiency—and also to provide means for increasing its efficiency without increasing its speed or its driving power.

This invention is an improvement on my patent No. 467,655, dated January 26, 1892, and consists in the improved blower and injector and its induction apparatus and the arrangement and combination of the various parts thereof, substantially as will be hereinafter more fully described and finally embodied in the clauses of the claims.

Figure 1:
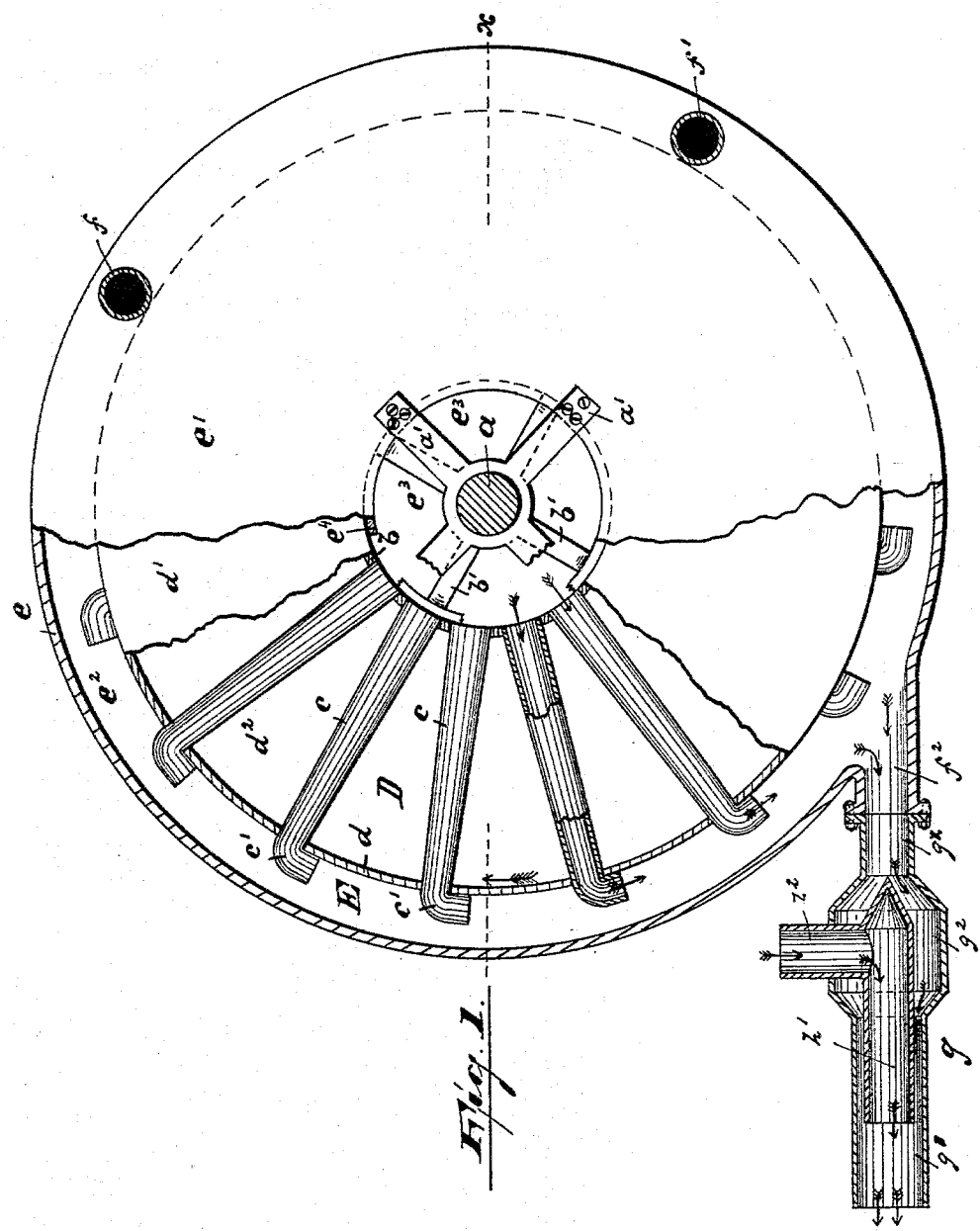
Figure 2:
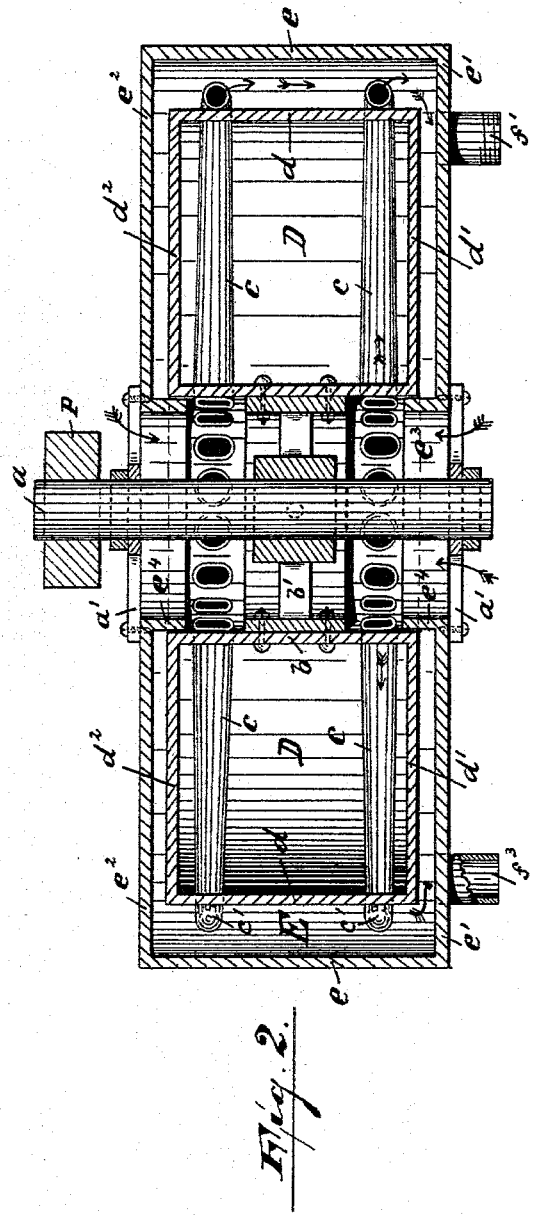

Referring to the accompanying drawings, in which like letters of reference indicate corresponding parts in each of the two figures: Figure 1. is a front elevation of my improved apparatus, part of it being shown in section and Fig. 2. is a sectional view on line $x$, Fig. 1.—the induction apparatus not being shown.

In said drawings, $a$ represents a shaft, adapted to be revolved by means of pulley P. To said shaft is secured a flanged wheel $b'$, serving as hub for the revolving drum D, consisting of inner ring or cylinder $b$, outer cylinder or ring $d$, and side walls $d'$, $d^2$. Within said drum are arranged one or more rows of radially extending tubes or passages $c, c$, secured with their inner open ends in cylinder or ring $b$, and with their outer ends in cylinder or ring $d$. These tubes or passages are preferably made tapering toward the outer end and are provided with an elbow $c'$, as shown in the drawings.

The drum D is adapted to be revolved in chamber E, consisting of side walls $e'$, $e^2$, and outer ring or cylinder $e$. The center parts of the said side walls are provided with openings $e^3$, $e^3$ and with flanges $e^4$, $e^4$, which latter are adapted to fit within cylinder $b$, thereby preventing an escapement of air or other fluids out of the chamber E through its side openings $e^3$, $e^3$. To the side walls $e'$, $e^2$ of chamber E, are also secured bearings $a'$, $a'$ for shaft $a$, but other ways of providing bearings for said shaft may be adopted. The chamber E is also provided with one or more outlets $f, f', f^2$, to which are secured by bolts or in any desired manner induction apparatus $g$—only one being shown in the drawings. This induction apparatus consists of a tube $g'$, provided near its connection end $g^x$ with an enlargement or drum $g^2$. Within said drum and tube is arranged a smaller tube $h'$, closed at the inner end, and provided with a branch tube $h^2$, extending through the drum $g^2$ of tube $g'$. The forward end of tube $h'$ opens into the tube $g'$.

In operation, the inner drum D is revolved at high speed and, the air entering through openings $e^3$, $e^3$, into the tubes or passages $c, c$,— is thrown by centrifugal force through elbows $c'$ $c'$ into chamber E and is compressed therein. As the elbows pass through the said compressed air, they produce at their outlets a vacuum, which latter assists the centrifugal force by drawing or sucking the air out of their respective pipes into the chamber E. As will be manifest there are two forces acting at the same time upon the air in the tubes or passages $c$ $c$: centrifugal force and suction force. The purpose of providing the drum D around the tubes or passages is to reduce their friction or resistance, when being revolved in the compressed air (or fluid) in chamber E. From said chamber E, the air passes through outlet $f^2$ (or $f, f'$, as the case may be) into the induction apparatus $g$ and, in passing around the inner tube $h'$, a vacuum and a suction are produced at the outlet of said tube $h'$, whereby the air is drawn through branch tube $h^2$ and an increased blast is produced at the outlet of the induction apparatus.

My improved apparatus can also be used for the purpose of drawing heat or smoke from the smoke-stack by connecting the branch tube $h^2$ with the latter,—or it can be used as a force pump for steam, water, gas or other fluids.

I do not intend to limit myself to the construction shown and described, as various changes can be made without changing the scope of my invention.

Having thus described my invention, what I claim as new, and desire to secure by Letters Patent, is—

1. A blower or injector, consisting of a stationary chamber, centrally located openings arranged in said chamber, a drum adapted to be revolved within said chamber and provided with centrally located openings, and a series of radial tubes arranged in said drum, the outer ends of said tubes extending through the periphery of the said drum, all said parts being arranged and adapted to operate substantially as described and for the purposes set forth.

2. A blower or injector, consisting of a stationary chamber, centrally located openings arranged in said chamber, a drum adapted to be revolved within said chamber and provided with centrally located openings, a series of radial tubes arranged in said drum, and elbows, resting on the periphery of said drum and secured to the outer ends of said tubes, said elbows being adapted to produce, when passing through the air—at their outlets—a vacuum and suction, substantially as described and set forth.

3. A blower or injector, consisting of a drum or chamber, provided at each side with a centrally located opening, an open cylinder arranged between said openings and adapted to be revolved within said chamber, and a drum secured to said open cylinder and provided with a series of radial tubes said tubes being adapted to conduct air or other fluids from said cylinder into said chamber, substantially as described and for the purposes set forth.

4. A blower or injector, consisting of a chamber, provided at each side with a centrally located opening, an open cylinder arranged between said openings and adapted to be revolved within said chamber, a shell secured to said cylinder, and a series of radial tubes secured to and in said cylinder and extending through said shell and provided at their outer ends with elbows, said elbows being adapted to produce—when passing through the air—at their outlets a vacuum and suction, all said parts being adapted to operate substantially as described and for the purposes set forth.

In testimony that I claim the foregoing I have hereunto set my hand this 9th day of January, 1892.

MARTIN R. RUBLE.

Witnesses:
ALFRED GARTNER,
WALTER THOMPSON.